US011303123B2

(12) United States Patent
Brunier

(10) Patent No.: US 11,303,123 B2
(45) Date of Patent: Apr. 12, 2022

(54) SYSTEMS AND METHODS FOR COMBINING AND DISTRIBUTING ELECTRICAL POWER FROM MULTIPLE SOURCES

(71) Applicant: Nauti-Tech Inc., Fort Lauderdale, FL (US)

(72) Inventor: Jack Brunier, Fort Lauderdale, FL (US)

(73) Assignee: Nauti-Tech Inc., Fort Lauderdale, FL (US)

( * ) Notice: Subject to any disclaimer, the term of this patent is extended or adjusted under 35 U.S.C. 154(b) by 0 days.

(21) Appl. No.: 16/800,773

(22) Filed: Feb. 25, 2020

(65) Prior Publication Data

US 2021/0021127 A1   Jan. 21, 2021

Related U.S. Application Data

(60) Provisional application No. 62/809,955, filed on Feb. 25, 2019, provisional application No. 62/907,149, filed on Sep. 27, 2019.

(51) Int. Cl.
*H02J 1/10* (2006.01)
*H02J 3/00* (2006.01)
*B63H 21/17* (2006.01)

(52) U.S. Cl.
CPC .............. *H02J 3/007* (2020.01); *B63H 21/17* (2013.01)

(58) Field of Classification Search
CPC ...... H02J 3/007; H02J 2310/42; B63H 21/17; B63J 2003/043
USPC .......................................................... 307/43
See application file for complete search history.

(56) References Cited

U.S. PATENT DOCUMENTS

| 10,135,250 B2 * | 11/2018 | Manson ............. H02J 13/0013 |
| 2009/0091867 A1 * | 4/2009 | Guzman-Casillas .. H02H 7/045 361/35 |
| 2021/0083483 A1 * | 3/2021 | Zhang ..................... H02M 1/32 |

* cited by examiner

*Primary Examiner* — Richard Tan
(74) *Attorney, Agent, or Firm* — FisherBroyles, LLP; Joseph F. Posillico

(57) ABSTRACT

Systems and methods are provided for continuously and automatically monitoring, controlling, and combining shore-based AC power sources for waterborne vessels while the vessels are at dock or in port. The systems can allow a one or more shore AC power AC to power the entire vessel, and automatically and safely join multiple power sources to power a single higher-current-capacity electrical distribution bus on the vessel. The systems can automatically monitor and evaluate the characteristics of multiple shore power sources to determine when it is possible to safely combine the sources. Also, the systems can recognize the disconnection/disablement of a shore power source, and can un-combine that power source from the other power sources feeding the system. The systems can automatically evaluate the phase, current and voltage of multiple AC sources, and combine the sources only after a specific set of conditions are satisfied.

8 Claims, 3 Drawing Sheets

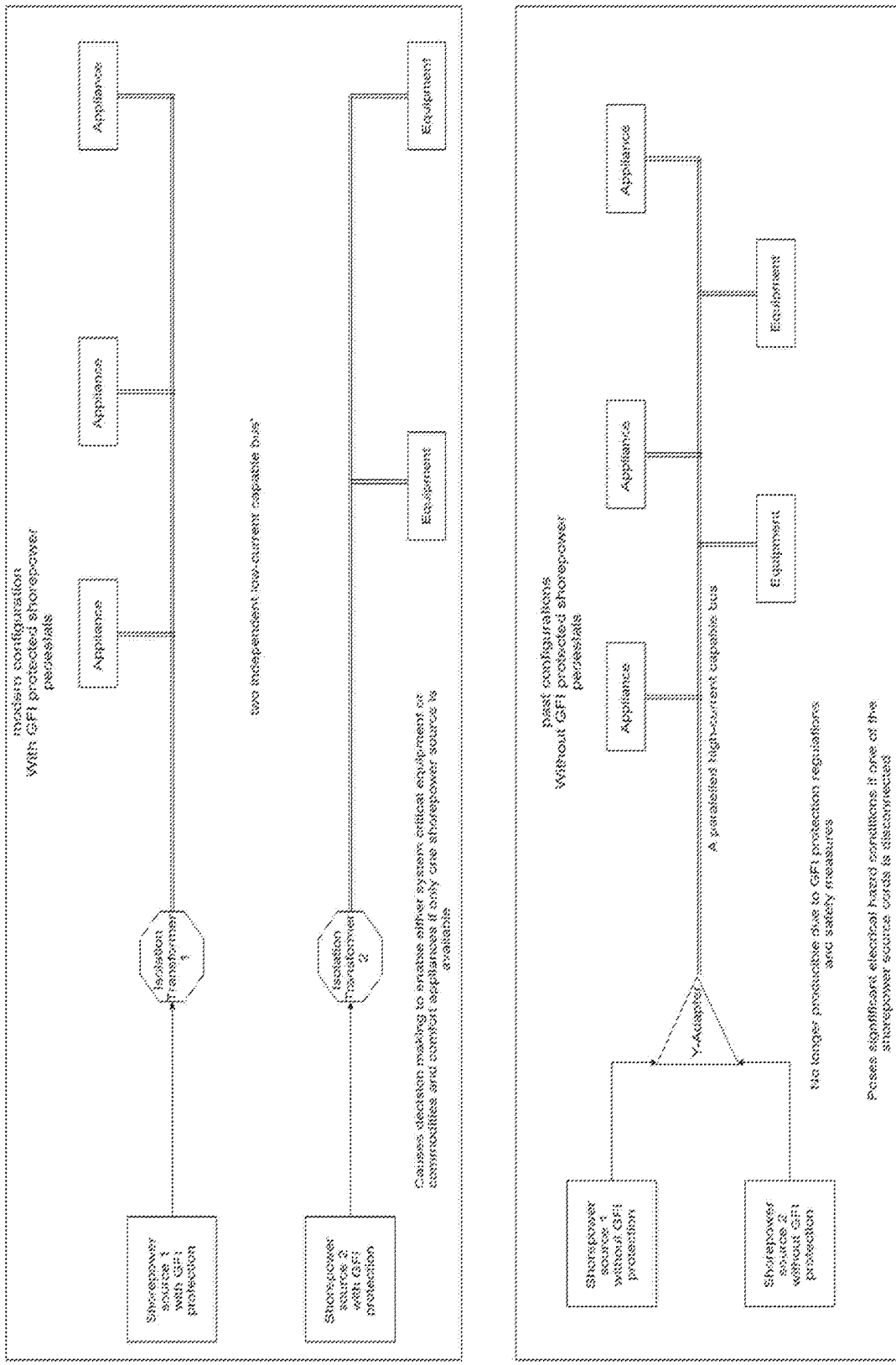
FIGURE 3 – PRIOR ART

SYSTEMS AND METHODS FOR COMBINING AND DISTRIBUTING ELECTRICAL POWER FROM MULTIPLE SOURCES

CROSS REFERENCE TO RELATED APPLICATIONS

This application is related to and claims the priority benefit of U.S. Provisional Application 62/809,955, filed on Feb. 25, 2019, which is incorporated herein by reference.

This application is related to and claims the priority benefit of U.S. Provisional Application 62/907,149, filed on Sep. 29, 2019, which is incorporated herein by reference.

FIELD OF INVENTION

The disclosed embodiments and methods relate to the supply and distribution of electrical power to vessels such as boats and ships.

BACKGROUND

When a boat, ship, or other type of water-borne vessel is docked, it is often desirable to connect the vessel to a single phase or split-phase alternating current (AC) power source on the shore. Typically, this is accomplished using large, flexible power cables and latching high-current connectors. Dock-side sources are often tailored to provide the amount of electrical current that vessels of a certain size typically require. For example, 50 ampere service is nominal for vessels less than 75 feet long; while 100 amperes is the nominal current for vessels beyond 75 feet in length.

At times it is necessary to dock a larger vessel in a space having inadequate electrical service, i.e., electrical service incapable of supplying electrical power at suitable current for the vessel. In the marine industry, a common solution to this situation is to combine the electrical current from two lower-capacity dockside sources in a paralleled configuration, thereby doubling the available current from shore. In previous solutions, electrical current from two or more lower-current shore AC sources is paralleled using an adapter, as shown schematically in FIG. 3. This solution served the industry well for decades, until recent worldwide safety regulations for docks have mandated the use of ground fault circuit interrupters, or GFCIs, to minimize the potential for electrical shock. A GFCI is activated, and interrupts the flow of current, upon sensing a ground fault as indicated by an imbalance in the current entering and leaving the GFCI. While GFCIs have made dock environments safer, their widespread use has generally eliminated the ability to parallel combine two or more shore sources, because such an arrangement is interpreted by a GFCI as a ground fault that instantly activates the GFCI.

SUMMARY

In one aspect, the disclosed systems and methods relate to continuous and automatic monitoring, control, and combining of shore-based AC power sources for waterborne vessels such as boats and ships while the vessels are at dock or in port. The systems preferably incorporate isolation/polarization transformers, and allow a single shore power AC source or multiple shore power AC sources to power the entire vessel. The disclosed embodiments automatically and safely join multiple power sources to power a single higher-current-capacity electrical distribution bus on the vessel. The systems pass the power from each shore-based source through a dedicated isolation/polarization transformer for that source. The systems automatically monitor and evaluate the characteristics of multiple shore power sources to determine when it is possible to safely combine the sources; and if it is not possible to combine them safely, the systems prohibit the combination. The monitored characteristics preferably include the phase and voltage differences between the available multiple power sources. Also, the systems are configured to recognize the disconnection/disablement of a shore power source feeding the system, in which case the systems will safely un-combine that power source from the other power sources feeding the system. Applicants have found that such an arrangement as taught and described herein has the highly desirable advantage of being able to prevent voltage back feed through the cable from the de-powered source, thereby avoiding a hazardous electrical condition. Live data and control of system parameters are preferably available on remote displays and or remote monitoring via the vessel's LAN, Wi-Fi, WAN, Bluetooth, CAN, Modbus RTU, RS232 or other communication network.

In another aspect, the disclosed systems and methods relate to continuous monitoring and automatic control of vessel AC power obtained from sources on the shore, such as dockside "shore power" electrical outlets. The disclosed systems are capable of taking two or more lower-current AC power sources and combining them into a single higher current source, an embodiment of which is shown for example schematically in FIG. 2. Applicants have found that such an arrangement as taught and described herein has the highly desirable advantage of being able to use a single load bus, which can provide better current repartitioning in comparison to a split bus system. Unlike in the past, when two smaller capacity shore cords would be paralleled into a simple "Y" configuration (see FIG. 3), the disclosed embodiments preferably make use of dual AC isolation/polarization transformers provided according to preferred embodiments of the present invention to condition the incoming AC power so that modernized dockside power connections treat the two shore cords as isolated loads. This in turn can allow the loads to be combined without activating, or tripping, the GFCIs currently used in most dockside power connections.

In another aspect, the disclosed systems and methods of the present invention automatically evaluate the phase, current and voltage of multiple AC sources, and combine the sources only after a specific set of conditions are satisfied an embodiment of which is shown for example schematically in FIG. 1. The systems can provide real-time monitoring and control via remotely mounted touchscreens and via the vessel's LAN, Wi-Fi, WAN, Bluetooth, CAN, Modbus RTU, RS232 or other communication networks. Information can also be sent to the "cloud" for monitoring on shore.

The present invention includes a system for combining electrical power from a first on-land source of electrical power and a second on-land source of electrical power to produce a source of electrical power for use on a vessel while at dock or port, comprising:

(a) first transformer comprising (i) a primary winding electrically connected to said first source of electrical power and (ii) a secondary winding;

(b) a second transformer comprising (i) a primary winding electrically connected to the second source of electrical power and (ii) a secondary winding;

(c) an on-board power distribution bus on the vessel;

(d) a combiner device comprising:

(i) a processing device generating a first output in response to a set of criteria relating to one or more electrical characteristics of said first transformer and a second output in response to a set of criteria relating to one or more electrical characteristics of said second transformer;

(ii) a first contactor that is communicatively coupled to said processing device and is electrically connectable to said secondary winding of said first transformer, wherein said secondary winding of said first transformer is or is not electrically connected to said power-distribution bus of the vessel in response to said first processing device output; and (iii) a second contactor that is communicatively coupled to said processing device and is electrically connectable to said secondary winding of said second transformer, wherein said secondary winding of said second transformer is or is not electrically connected to said power-distribution bus of the vessel in response to said second processing device output.

The present invention includes a method for combining electrical power from a first on-land source of electrical power and a second on-land source of electrical power to produce a source of electrical power for use on a vessel while at dock or port, comprising:

(a) providing a first transformer comprising (i) a primary winding electrically connected to said first source of electrical power and (ii) a secondary winding;

(b) providing a second transformer comprising (i) a primary winding electrically connected to the second source of electrical power and (ii) a secondary winding;

(c) obtaining access to an on-board power distribution bus on the vessel;

(d) selectively combining or not said first and second sources of electrical power to provide a source of power to said vessel by providing a combiner device comprising:

(i) a processing device generating a first output in response to a set of criteria relating to one or more electrical characteristics of said first transformer and a second output in response to a set of criteria relating to one or more electrical characteristics of said second transformer;

(ii) a first contactor that is communicatively coupled to said processing device and is electrically connectable to said secondary winding of said first transformer, wherein said secondary winding of said first transformer is or is not electrically connected to said power-distribution bus of the vessel in response to said first processing device output; and (iii) a second contactor that is communicatively coupled to said processing device and is electrically connectable to said secondary winding of said second transformer, wherein said secondary winding of said second transformer is or is not electrically connected to said power-distribution bus of the vessel in response to said second processing device output.

BRIEF DESCRIPTION OF THE DRAWINGS

FIG. 3 is a schematic chart showing previously used configurations.

DETAILED DESCRIPTION

Figure 1:
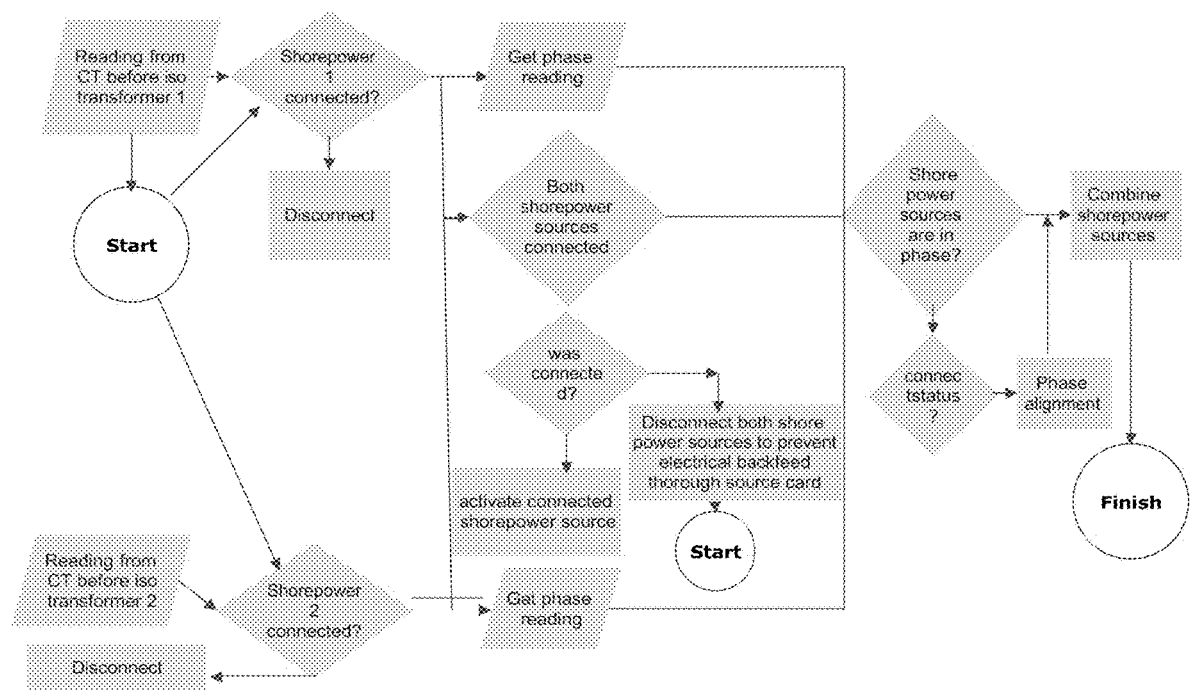
FIG. 1 is a schematic chart showing the logical algorithm of a device according to an embodiment of the present invention.
Figure 2:
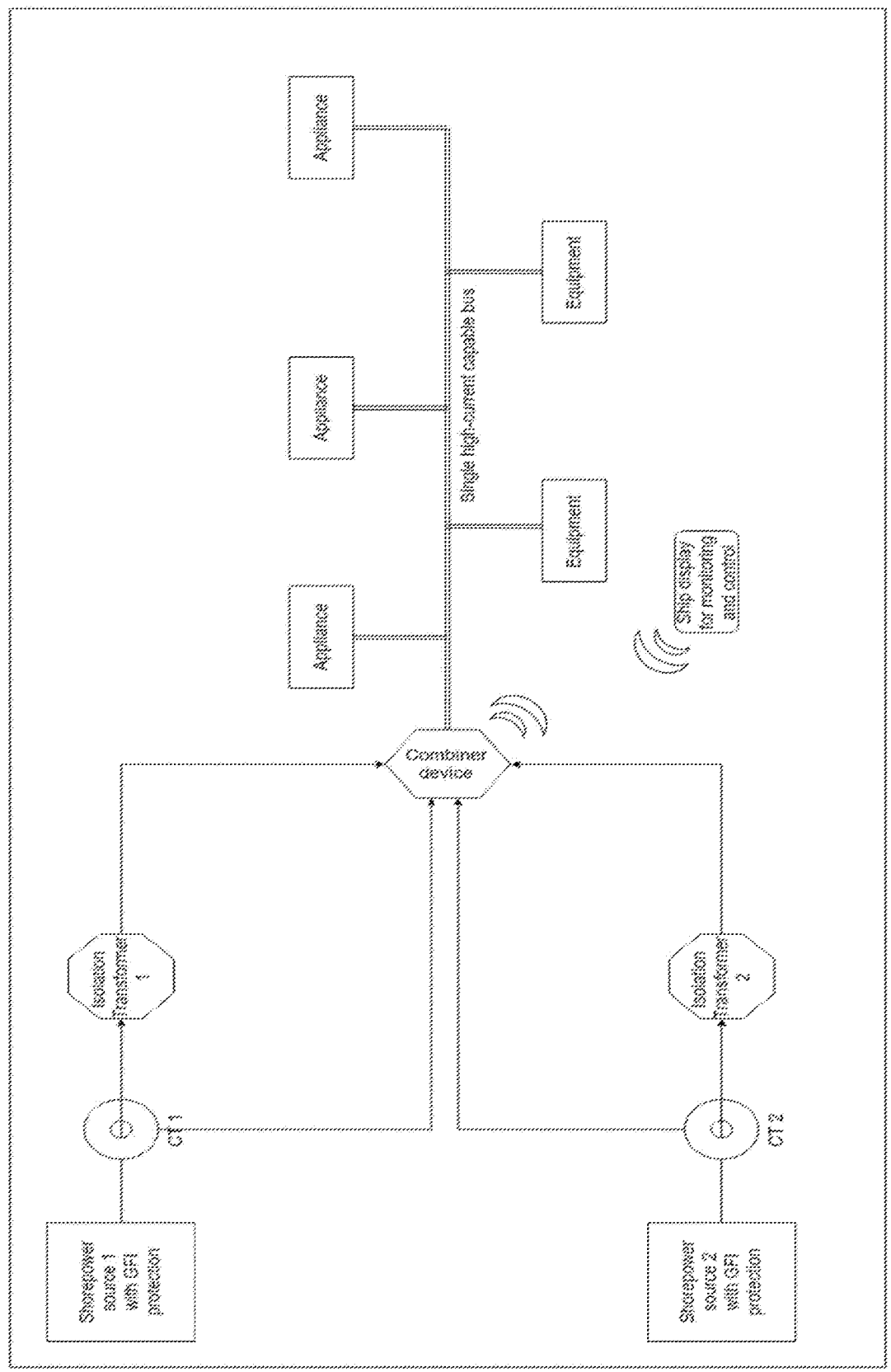
FIG. 2 is a schematic chart showing general system configuration of a device according to an embodiment of the present invention.

Systems and methods are provided for combining and distributing electrical power from multiple sources, particularly and preferably from at least a first and second on-land source of electrical power to provide power to a vessel at dock or in port. The systems and methods are suitable for use with sources equipped with GFCIs. FIG. 2 schematically depicts an exemplary embodiment of such a system; FIG. 1 is a flow chart depicting operation of the exemplary embodiment. The system of FIG. 2 can be located on a water-borne vessel such as a ship or boat. The system preferably receives electrical power from two or more GFCI-protected power sources located on shore, e.g., dockside, via respective flexible cables.

The system is configured to combine (or to selectively not combine) two or more of such on-shore power sources. The system preferably includes a first and a second current sensor; and a first and a second transformer. Alternative embodiments of the system can be configured to combine more than two power sources, in which case the systems can include a number of transformers and a number of current sensors equal to the number of power sources to be combined or potentially combined.

The systems and methods also preferably include or use a combiner device communicatively coupled to the at least first and second current transformers, and electrically connected to the at least first and second transformers. The system further preferably also includes a high-capacity power distributor, for example, a load bus that is electrically connected to the combiner device and is preferably located on the vessel.

Each transformer can be a 1:1 alternating current (AC) isolation/polarization transformer. Each of the transforms can include an internal electrostatic shield which can be connected to the shore ground reference for noise immunity. The primary winding of a first of the transformers is electrically connected to a first of the shore-based electrical sources. The primary winding of the second transformer is electrically connected to a second of the shore-based electrical sources.

The current sensors can be, for example, current transformers. A first of the current transformers is preferably positioned between the first power source and the primary winding of the first transformer; the second current transformer is preferably positioned between the second power source and the primary winding of second transformer. The current sensors are preferably communicatively coupled to a microcontroller of the combiner device. Each current sensor preferably provides the microcontroller with an indication of the current flow between the power source and the primary winding associated with the current sensor; thereby providing an indication of whether the primary winding is connected to a power source. The current transformer can make this determination even when its associated transformer is unloaded, because various parasitic hysteresis and eddy current losses within the transformer core will provide enough quiescent current flow to enable a positive determination of whether the primary winding is connected to a power source.

The combiner device preferably includes a processing device in the form of the microcontroller, and a plurality of contactors communicatively coupled to the microcontroller. The microcontroller can include a processor, such as a microprocessor; a memory communicatively coupled to the microprocessor; and computer executable instructions stored on the memory. The computer executable instructions, when executed by the processor, preferably cause the microprocessor to perform the logical operations and control functions discussed herein.

The combiner device preferably includes at least four contactors. Two of the contactors are preferably non-reversing contactors; and the other two contactors are preferably reversing contactors. One of the non-reversing contactors, and one of the reversing contactors are electrically connected to the power-distribution bus, and to the secondary winding of the first transformer. The other non-reversing contactor and the other reversing contactor are preferably electrically connected to the bus, and to the secondary winding of the second transformer. Each contactor, when actuated in response to a signal from the microcontroller, establishes electrical contact between the bus and the secondary winding of the transformer to which the contactor is connected. When actuated, each reversing contactor reverses, or shifts by 180 degrees, the phase of the current passing through the contactor. The non-reversing contactors do not effectuate a phase change of the current passing therethrough. When in the un-actuated state, the contactors interrupt electrical contact between the bus and the associated first or second transformer, and the bus remains electrically isolated from the power source associated with the transformer.

The combiner device also preferably includes at least two voltage sensors communicatively coupled to the microcontroller. The voltage sensors sense the incoming voltages from the secondary windings of the respective at least first and second transformers. Thus, those skilled in the art will appreciate and understand based on the teachings contained herein that the combiner device can be equipped with more than two voltage sensors and more than four contactors in applications where the system is to be used in conjunction with more than two power sources.

The power-distribution bus facilitates distribution of the combined power from the first and second transformers to the various electrical components and electrical outlets on the vessel.

The microcontroller is preferably configured to evaluate the voltage, current, and phase characteristics of the transformers; and to make logical decisions in accordance with the teachings contained herein based on the evaluations. Specifically, before actuating any of the contactors to establish electrical contact between the power-distribution bus and the first and second transformers, the microcontroller is configured to determine whether the first and second transformers are connected to respective power sources. As noted above, the microcontroller makes this determination based on the inputs of the current sensors. If the microcontroller determines that the first and/or the second transformer is not connected to a power source, the microcontroller will not send an activation signal to the contactors associated with the unpowered transformer; and the unpowered transformer will remain electrically isolated from the power-distribution bus and the other transformer. This feature can help eliminate the potential for dangerous back-feeding of electrical power from the powered transformer to the unpowered transformer, and back to shore via the cable connecting the unpowered transformer to shore.

Upon determining that only one of the at least first and second transformers is connected to a power source, the microcontroller will send an activation signal to the non-reversing contactor associated with the connected transformer. The non-reversing contactor, upon receiving the signal, will actuate so as to establish an electrical connection between the bus and the secondary winding of its associated transformer; and the bus will be energized exclusively by that particular transformer and its power source.

If the microcontroller determines that (i) both transformers are connected to a respective power source (ii) the measured voltages from the two secondary windings are similar, e.g., are within about ten volts; (iii) the phase relationship of the sinusoidal AC outputs in the secondary windings of the first and second transformers is about zero; and (iv) the user has selected the option available when configuring the microprocessor and/or selectively by the user at the time of use, to combine the outputs of the first and second transformers, the microcontroller will send actuation signals to the non-reversing contactors associated with the first and second transformers. The non-reversing contactors, upon receiving the respective signals, will actuate so as to establish electrical connections between the bus and the secondary windings of the two transformers. The respective outputs of the transformers, which have been deemed suitable for combining by meeting the above criteria, are each fed to the power-distribution bus and are combined in parallel on the bus.

The microcontroller preferably evaluates the above-noted voltage, current, and phase characteristics of the transformers on a continuous basis. If the microcontroller determines that the voltage, current, and phase characteristics no longer meet one or more of the above criteria, the microcontroller will take appropriate action to change the operating state of the system. For example, if the microcontroller determines that one of the transformers no longer is receiving power from its power source, the microcontroller will immediately send a deactivation signal to the contactor connecting that transformer to the power-distribution bus, to disconnect and electrically isolate the unpowered transformer from the bus.

In a scenario in which the microcontroller determines that the respective outputs of the secondary windings of the first and second transformers are about 180 degrees out of phase, but the operating conditions nevertheless meet the above-noted criteria (i), (ii), and (iv), the microcontroller will send actuation signals to the non-reversing contactor associated with the first transformer, and to the reversing contactor associated with the second transformer. The resulting phase shifting performed by the reversing contactor will make the output associated with the second transformer suitable for being combined with the output of the first transformer when the respective outputs reach the power-distribution bus. This out-of-phase scenario can occur, for example, when one of the shore power sources is incorrectly wired, i.e., is wired with a polarity that is reversed in relation to that of the other power source.

In another scenario, the microcontroller may initially determine that the phase relationship between the outputs of the secondary windings exceeds about zero, i.e., the phase relationship does not meet above criterion (iii), but the phase angle is not completely reversed. In such a case, provided the first transformer is connected to a power source, the microcontroller will send an activation signal to the non-reversing contactor associated with the first transformer, to place the secondary winding of the first transformer in electrical contact with the power-distribution bus. The microcontroller will not send an activation signal to the contactors associated with the second transformer regardless of whether the user has selected the option to combine the outputs of the first and second transformers, and the second transformer and the second power source will remain isolated from the bus.

Also, the microcontroller can be preferably configured to permit about plus or minus and acceptable drift (as determined by a particular user and/or configurer) in phase relationship between the outputs of the secondary windings after the outputs have been combined on the load bus, for example, to permit about five degrees of drift in the phase relationship between the outputs of the secondary windings after the outputs have been combined on the load bus, i.e., after the microcontroller has determined that, initially, the above criteria (i) through (iv) have been met and electrical contact has been established between both secondary windings and the load bus. If the microcontroller determines that any subsequent drift in the phase relationship exceeds the acceptable drift (preferably about five degrees), it will immediately send a deactivation signal to the contactor that is connecting that second transformer to the power-distribution bus, to disconnect, and electrically isolate the second transformer from the bus.

Likewise, in the event the measured voltages associated with the secondary windings of the at least first and second transformers do not initially match in accordance with above criterion (ii), and provided the first transformer is connected to a power source, the microcontroller will preferably send an activation signal to the non-reversing contactor associated with the first transformer, to place the secondary winding of the first transformer in electrical contact with the power-distribution bus. The microcontroller will not send an activation signal to the contactors associated with the second transformer regardless of whether the user has selected the option to combine the outputs of the first and second transformers, and the second transformer will remain isolated from the bus.

If the microcontroller determines that the difference between the voltage outputs of the first and second transformers drifts by more than a selected amount, for example about ten degrees, once the outputs have been combined, the microcontroller will immediately send a deactivation signal to the contactor that is connecting that second transformer to the power-distribution bus, to disconnect, and electrically isolate the second transformer from the bus.

Applicants have come to appreciate that combining the outputs of two isolation/polarization transformers has the potential to generate undesirable "circulating currents" if the output voltages of the transformers differ by more than a few percent. To prevent this undesirable scenario, the system will not combine the transformer outputs if the output-voltage difference is greater than a selected voltage differential, preferably about seven volts. After the transformer outputs have been combined, the system cannot use the output-voltage difference to determine whether circulating currents may be present, because the output voltages will be about equal. Under these circumstances, the system will analyze the current and phase characteristics of the outputs to determine whether circulating currents are present. If circulating currents are detected, the system will un-combine the transformer outputs.

Given the teachings contained herein, those skilled in the art will be able to adapt the above logical operations to applications in which more than two power sources are being connected to the power-distribution bus.

In other possible embodiments (not shown), the system can be powered by powered by a single shore-based power source, and can supply a dual load bus, or a dual load bus equipped with a tie bar. In other possible embodiments, the system can be configured to combine the power provided by the two shore-based power sources, while supplying the dual load, tie-bar-equipped bus.

In other possible embodiments, the system can be used to control and combine the outputs of two generators, in addition to combining the power from two shore-based power sources. The generators are located on the vessel, and are used to provide power when shore-based power is not available.

Embodiments of the system can be applied to make a complete power management system. For example, the microcontroller can be configured to facilitate manual, or automatic starting and stopping of the generators. Also, the microcontroller can be configured to select a source and a load bus on a manual or automatic basis; to combine loads automatically; and to shed loads automatically.

Embodiments of the system can facilitate seamless transfer between shore power and the generators, and/or between the generators. In particular, the microcontroller can be configured to adjust the target generator speed to synchronize the generator output with the power source feeding the vessel; so that the generator is operated on a "make before break" basis that permits the loads to be transferred to the new source without a blackout period. A generator seamless transfer module can be installed in each generator; and can be connected to the microcontroller via an RS485 data link so that the microcontroller is communicatively coupled to the governor of the generator. The module can gather information relating to voltage, current, frequency, and phasing of the generator; and the microcontroller can use this information to facilitate a smooth, uninterrupted load transfer to the generator.

Embodiments of the system also can be configured to automatically start and stop one, or both of the generators. In particular, if shore power is lost, the microcontroller, after a predetermined time period that can be adjusted by the user, sends an input to a pre-selected one of the generators, to cause the generator to start and to begin feeding power to the vessel. The microcontroller stops the generator automatically, when shore-based power is restored; and transfers the load back to the shore-based power source.

Embodiments of the system can be further configured to perform circulating current mitigation. In particular, the microcontroller monitors the circulating current when two sources, e.g., the shore-based power transformers, are combined. The microcontroller generates an input that opens the combiner contactor if the measured circulating current becomes higher than a pre-selected value.

Embodiments of the system can be equipped with a daily/monthly power meter.

Embodiments of the system also can be equipped with local and/or cloud-based alarms for generating alerts for high or low values of voltage, current, and power; and for power failures.

Embodiments of the system also can be equipped with voltage, current, and frequency monitoring.

Embodiments of the system can include one or more human-machine interface (HMI) touch screens. The HMI touch screens can be used to facilitate user inputs, and to display operating parameters, alarms, etc. Multiple HMI touch screens can be wired, for example in a daisy-chain arrangement. The HMI touch screens can be, for example, 7-inch, 5-inch, and/or 3-inch screens.

Embodiments of the system can be configured to make a real-time-events and errors log accessible via a page displayed on the HMI touch screen display.

Embodiments of the system also can be configured to provide automatic load shedding. The load shedding can be configurable by the user; and can be adjusted automatically, depending on the particular power source to which the system is connected.

Embodiments of the system can include multiple communication ports, such as Canbus, Modbus RTU, TCP-IP, Wifi, thereby permitting the system to be integrated into existing systems.

I claim:

1. A system for combining electrical power from a first source of electrical power and a second source of electrical power, comprising:
a first transformer having a primary winding configured to be electrically connected to the first source of electrical power; and a secondary winding;
a second transformer having a primary winding configured to be electrically connected to the second source of electrical power; and a secondary winding;
a combiner device comprising:
a processing device;
a first contactor communicatively coupled to the processing device, electrically connected to the secondary winding of the first transformer, and configured to establish an electrical connection between the secondary winding of the first transformer and a power-distribution bus of a vessel in response to a first input from the processing device; and
a second contactor communicatively coupled to the processing device, electrically connected to the secondary winding of the second transformer, and configured to establish an electrical connection between the secondary winding of the second transformer and the power-distribution bus in response to a second input from the processing device; wherein: the processing device is configured to generate the first and second inputs in response to a set of criteria relating to electrical characteristics of the first and second transformers, said set of criteria comprising whether the first and second transformers are connected to the respective first and second sources of electrical power; a difference between output voltages of the secondary windings of the first and second transformers; and a phase angle difference between output currents of the secondary windings of the first and second transformers.

2. The system of claim 1, wherein the processing device is further configured to generate the first and second inputs only when the phase angle difference is less than a predetermined value.

3. The system of claim 2, wherein the processing device is further configured to generate the first and second inputs only when the difference between the output voltages is less than a predetermined value.

4. The system of claim 1, wherein the processing device is further configured to generate the first and second inputs only when the first and second transformers are connected to the respective first and second sources of electrical power.

5. The system of claim 1, wherein the first and second transformers are isolation/polarization transformers.

6. The system of claim 1, wherein:
the first contactor is further configured to interrupt the electrical connection between the secondary winding of the first transformer and the power-distribution bus in response to a third input from the processing device;
the second contactor is further configured to interrupt the electrical connection between the secondary winding of the second transformer and the power-distribution bus in response to a fourth input from the processing device; and
the processing device is further configured to generate the third input in response to a determination that the primary winding of the first transformer is not electrically connected to the first source of electrical power; and to generate the fourth input in response to a determination that the primary winding of the second transformer is not electrically connected to the second source of electrical power.

7. The system of claim 1, wherein the processing device is further configured to continuously monitor: a current between the primary winding of the first transformer and the first source of electrical power; a current between the primary winding of the second transformer and the second source of electrical power; the output voltage of the secondary winding of the first transformer; the output voltage of the secondary winding of the second transformer; a phase of the output current of the secondary winding of the first transformer; and a phase of the output current of the secondary winding of the second transformer.

8. The system of claim 1, wherein the processing device is further configured to communicate with a communication network of the vessel.

* * * * *